US008515811B2

(12) United States Patent  
Taylor

(10) Patent No.: US 8,515,811 B2
(45) Date of Patent: Aug. 20, 2013

(54) ONLINE ADVERTISING VALUATION APPARATUS AND METHOD

(75) Inventor: David C. Taylor, Mapleton, UT (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/220,473

(22) Filed: Aug. 29, 2011

(65) Prior Publication Data

US 2011/0313854 A1 Dec. 22, 2011

Related U.S. Application Data

(63) Continuation of application No. 11/763,408, filed on Jun. 14, 2007, now Pat. No. 8,027,876, which is a continuation-in-part of application No. 11/500,607, filed on Aug. 8, 2006.

(60) Provisional application No. 60/706,261, filed on Aug. 8, 2005, provisional application No. 60/706,262, filed on Aug. 8, 2005, provisional application No. 60/814,410, filed on Jun. 15, 2006, provisional application No. 60/814,614, filed on Jun. 15, 2006.

(51) Int. Cl.
*G06Q 30/00* (2012.01)

(52) U.S. Cl.
USPC ............................................. 705/14.47

(58) Field of Classification Search
USPC .............................. 705/14.47, 14.73
See application file for complete search history.

(56) References Cited

U.S. PATENT DOCUMENTS

| 4,922,414 A | 5/1990 | Holloway et al. |
| 5,243,520 A | 9/1993 | Jacobs et al. |
| 5,265,065 A | 11/1993 | Turtle |
| 5,301,109 A | 4/1994 | Landauer et al. |
| 5,321,833 A | 6/1994 | Chang et al. |
| 5,331,556 A | 7/1994 | Black, Jr. et al. |

(Continued)

FOREIGN PATENT DOCUMENTS

| GB | 2336696 | * 4/1998 |
| GB | 2336696 | 10/1999 |

(Continued)

OTHER PUBLICATIONS

Jayashi, Yoshihiko; Searching Text-rich XML Documents with Relevance Ranking; Jul. 28, 2000; ACM SIGIR 2000 Workshop on XML and Information Retrieval.*

(Continued)

*Primary Examiner* — John G Weiss
*Assistant Examiner* — Adam Chornesky
(74) *Attorney, Agent, or Firm* — Foley and Lardner LLP; John D. Lanza

(57) ABSTRACT

A method for determining the value provided to an advertiser through the advertiser's online advertisements may begin with providing an online advertisement linked to content. A macro-context may be obtained that quantifies the affinity of the content for a plurality of domains corresponding to a semantic space. A personalization vector may be obtained that quantifies the affinity of at least one aspect of a user for the plurality of domains. The user may then select the online advertisement. A match value may be calculated that quantifies the similarity between the personalization vector and the macro-context. The advertiser may then be charged a monetary amount for the user's "click." The monetary amount may be based, at least in part, on the match value.

17 Claims, 4 Drawing Sheets

(56) References Cited

U.S. PATENT DOCUMENTS

| | | | |
|---|---|---|---|
| 5,404,505 | A | 4/1995 | Levinson |
| 5,469,354 | A | 11/1995 | Hatakeyama et al. |
| 5,537,132 | A | 7/1996 | Teraoka et al. |
| 5,576,954 | A | 11/1996 | Driscoll |
| 5,642,502 | A | 6/1997 | Driscoll |
| 5,642,519 | A | 6/1997 | Martin |
| 5,649,186 | A | 7/1997 | Ferguson |
| 5,655,116 | A | 8/1997 | Kirk et al. |
| 5,664,115 | A | 9/1997 | Fraser |
| 5,675,819 | A * | 10/1997 | Schuetze .................. 704/10 |
| 5,708,825 | A | 1/1998 | Sotomaor |
| 5,724,571 | A | 3/1998 | Woods |
| 5,737,619 | A | 4/1998 | Judson |
| 5,754,939 | A | 5/1998 | Herz et al. |
| 5,758,328 | A | 5/1998 | Giovannoli |
| 5,781,879 | A | 7/1998 | Arnold et al. |
| 5,784,608 | A | 7/1998 | Meske, Jr. et al. |
| 5,794,207 | A | 8/1998 | Walker et al. |
| 5,796,945 | A | 8/1998 | Tarabella |
| 5,799,143 | A | 8/1998 | Butt et al. |
| 5,832,435 | A | 11/1998 | Silverman |
| 5,832,520 | A | 11/1998 | Miller |
| 5,845,278 | A | 12/1998 | Kirsch et al. |
| 5,848,410 | A | 12/1998 | Walls et al. |
| 5,870,735 | A | 2/1999 | Agrawal et al. |
| 5,873,079 | A | 2/1999 | Davis et al. |
| 5,895,454 | A | 4/1999 | Harrington |
| 5,900,005 | A | 5/1999 | Saito |
| 5,901,287 | A | 5/1999 | Bull et al. |
| 5,913,210 | A | 6/1999 | Call |
| 5,915,236 | A | 6/1999 | Gould et al. |
| 5,918,213 | A | 6/1999 | Bernard et al. |
| 5,920,836 | A | 7/1999 | Gould et al. |
| 5,924,105 | A | 7/1999 | Punch, III et al. |
| 5,926,808 | A | 7/1999 | Evans et al. |
| 5,937,422 | A | 8/1999 | Nelson et al. |
| 5,946,488 | A | 8/1999 | Tanguay et al. |
| 5,953,718 | A | 9/1999 | Wical |
| 5,963,940 | A * | 10/1999 | Liddy et al. .................. 1/1 |
| 5,983,216 | A | 11/1999 | Kirsch et al. |
| 5,983,221 | A | 11/1999 | Christy |
| 5,999,925 | A | 12/1999 | Evans |
| 6,006,221 | A * | 12/1999 | Liddy et al. .................. 1/1 |
| 6,018,733 | A | 1/2000 | Kirsch et al. |
| 6,018,760 | A * | 1/2000 | Oishi et al. .................. 709/204 |
| 6,021,409 | A | 2/2000 | Burrows |
| 6,023,697 | A | 2/2000 | Bates et al. |
| 6,029,146 | A | 2/2000 | Hawkins et al. |
| 6,029,165 | A | 2/2000 | Gable |
| 6,047,390 | A | 4/2000 | Butt et al. |
| 6,070,134 | A | 5/2000 | Richardson et al. |
| 6,073,097 | A | 6/2000 | Gould et al. |
| 6,073,167 | A | 6/2000 | Poulton et al. |
| 6,125,352 | A | 9/2000 | Franklin et al. |
| 6,175,830 | B1 | 1/2001 | Maynard |
| 6,229,825 | B1 * | 5/2001 | Nitta et al. .................. 370/498 |
| 6,260,077 | B1 | 7/2001 | Rangarajan et al. |
| 6,289,342 | B1 | 9/2001 | Lawrence et al. |
| 6,314,420 | B1 | 11/2001 | Lang et al. |
| 6,397,209 | B1 | 5/2002 | Reed et al. |
| 6,411,953 | B1 | 6/2002 | Ganapathy et al. |
| 6,421,675 | B1 | 7/2002 | Ryan et al. |
| 6,438,539 | B1 | 8/2002 | Korolev et al. |
| 6,446,061 | B1 | 9/2002 | Doerre et al. |
| 6,446,081 | B1 | 9/2002 | Preston |
| 6,453,356 | B1 | 9/2002 | Sheard et al. |
| 6,473,754 | B1 | 10/2002 | Matsubayashi et al. |
| 6,675,159 | B1 * | 1/2004 | Lin et al. .................. 1/1 |
| 6,745,161 | B1 | 6/2004 | Arnold et al. |
| 6,760,720 | B1 | 7/2004 | De Bellis |
| 7,013,300 | B1 | 3/2006 | Taylor |
| 7,113,917 | B2 * | 9/2006 | Jacobi et al. .................. 705/14.53 |
| 7,181,438 | B1 * | 2/2007 | Szabo .................. 1/1 |
| 7,251,637 | B1 * | 7/2007 | Caid et al. .................. 706/15 |
| 7,519,529 | B1 * | 4/2009 | Horvitz .................. 704/7 |
| 7,680,796 | B2 * | 3/2010 | Yeh et al. .................. 707/724 |
| 7,856,441 | B1 * | 12/2010 | Kraft et al. .................. 707/758 |
| 2002/0077997 | A1 | 6/2002 | Colby et al. |
| 2002/0129341 | A1 | 9/2002 | Hibdon |
| 2002/0198882 | A1 * | 12/2002 | Linden et al. .................. 707/10 |
| 2003/0212655 | A1 | 11/2003 | Volcani et al. |
| 2004/0068552 | A1 * | 4/2004 | Kotz et al. .................. 709/218 |
| 2004/0167845 | A1 * | 8/2004 | Corn et al. .................. 705/37 |
| 2005/0288954 | A1 * | 12/2005 | McCarthy et al. .................. 705/1 |
| 2008/0133716 | A1 * | 6/2008 | Rao et al. .................. 709/220 |
| 2011/0313854 | A1 * | 12/2011 | Taylor .................. 705/14.47 |

FOREIGN PATENT DOCUMENTS

| | | | |
|---|---|---|---|
| WO | WO96/23265 | | 8/1996 |
| WO | WO9623265 | * | 8/1996 |
| WO | WO 98/26357 | | 6/1998 |
| WO | WO9826357 | * | 6/1998 |

OTHER PUBLICATIONS

Karlgren, Jussi; Vector-Based Semantic Analysis using Random Indexing and Morphological Analysis for Cross-Lingual Information Retrieval; SICS Stockholm; www. sics.se/humle/Homeosemy.*

Rao, Ashwin G.; Experiments in Query Processing at LEXIS-NEXIS for TREC-7.*

Scirus White Paper; How Scirus Works; updated Aug. 2004.*

Xiaoli Li, Bing Liu, tong-Heng Phang and Minqing Hu; Using Micro Information Units for Internet Search.* www.microset.com/search, Text Search 1997-2004, two pages.

Xiaoli Li at al., *Using Micro Information Units for Internet Search*, proceedings of the eleventh international conference on information and knowledge management, 2002, pp. 566-576.

Jussi Karlgren at al., "*An approach for the extraction of information from heterogeneous sources of textual data*", Knowledge representation meets databass, proceedings of the 4$^{th}$ KRDB workshop, Aug. 1997, pp. 1-7.

Yoshihiko Hayashii et al., "*Searching text-rich XML documents with relevance ranking*", ACM SIGIR 2000 workshop on XML an information retrieval, Jul. 28, 2000, 7 pages.

Ashwin G Rao et al. "*Experiments in Quiery Processing at LEXIS-NEXIS for TrEC-7*", no date, 10 pages.

* cited by examiner

ONLINE ADVERTISING VALUATION APPARATUS AND METHOD

RELATED APPLICATIONS

The present application is a continuation of U.S. patent application Ser. No. 11/763,408, filed Jun. 14, 2007, which is a continuation-in-part of U.S. patent application Ser. No. 11/500,607 filed Aug. 8, 2006, which claims the benefit of U.S. Provisional Patent Application Ser. No. 60/706,261 filed Aug. 8, 2005, U.S. Provisional Patent Application Ser. No. 60/706,262 filed Aug. 8, 2005, U.S. Provisional Patent Application Ser. No. 60/814,410 filed Jun. 15, 2006, and U.S. Provisional Patent Application Ser. No. 60/814,614 filed Jun. 15, 2006.

BACKGROUND

1. The Field of the Invention

This invention relates to a data extraction tool and, more particularly, to novel systems and methods for searching, organizing, and presenting information stored in electronic format.

2. The Background Art

In what is known as the information age, information is readily available electronically through information repositories known as datastores and databases. Datastores are substantially unorganized collections of data, while databases are indexed in some fashion. The Internet, the world's largest database, has made available enormous quantities of information to anyone with a personal computer and Internet access. This can be very helpful for people who wish to learn about something or conduct business in the convenience of their own homes. However, it can also be tremendously time-consuming to locate a desired bundle of information among the millions available.

The Internet is organized only by the name of each web site. Each individual or group maintaining a web site decides how that web site will be organized. Thus, there is no official catalog of information available on the Internet. Anyone desiring information must hypothesize which web sites would be likely to have the desired data and navigate through those web sites according to the organization set up by the web site's operator. Although other databases and datastores are small, many exhibit the same organizational difficulties.

Some companies have developed portals to automate a portion of the search for information. Most of these portals are text-based. Currently available portals include search engines, and directories.

To use a search engine, a user provides a set of words to search for, and the search engine returns a list of "hits" or web sites containing those words. Search engines are advantageous in that they require little user input or understanding of the operation of the search engine. However, they can be difficult to work with for a number of reasons.

For example, the list may contain a vast number of hits, few of which actually relate to the desired piece of data. Conventional keyword searching returns any instance of the word being sought, regardless of the way the word is used in the web site. Although a user may add additional key words to narrow the search, there often is no combination of words that must be found together to exclude all irrelevant pages while keeping all relevant ones.

Also, many conventional search engines return only the home page of a web site that contains the keyword. It is then up to the user to find the keyword in a site and determine whether it is relevant. This requires a user to determine how the site is organized and follow the right links. This can be difficult because there may be no links that clearly indicate where the keyword is located.

The output from most search engines is simply a page of links to possibly relevant sites. A user may wish to supplement or rearrange the search results. However, the way the results of a search are formatted typically makes addition or modification of criteria difficult or impossible.

Moreover, information obtained through a search often becomes outdated. Currently, a user must revisit previously found sites to determine whether the old information is still valid. Additionally, a user must perform a new search to locate any newly relevant sites and search through those sites for relevant information.

Directories function differently than search engines. Rather than search based on keywords provided by a user, most directories provide a user with an information scheme, often hierarchically organized. The user then chooses what type of information to search for, designating narrower groups of information with each choice. Ultimately, the user reaches the bottom level of the hierarchy and receives a list of links to information within that level.

Directories are advantageous in that information concerning a certain topic is typically grouped together. A directory probably will not inundate a user with information, but rather provide a few links believed to be important by the creators of the directory. Nevertheless, directories have drawbacks of their own.

For example, traditional directories contain information deemed of value by those who compile them. A user may have an entirely different view of what is important and what is irrelevant. A user may thus find that information needed simply is not available on the directory.

Also, directories take time to navigate. A user must make a series of decisions to reach any useful information. Even then, a user may find it necessary to backtrack and choose a different route through the hierarchy. Since a user cannot fashion groupings of information, the user may be required to view several branches of the hierarchy to obtain the full range of information desired.

Moreover, if a user does not know how to classify the bit of information sought, the user may not even be able to find it in the directory. For example, a user desiring to find the meaning of "salmonella" in a biological directory may spend great amounts of time looking through the "aquatic life" branch of the directory, without ever realizing that "salmonella" is more properly classified as "microscopic life." The more a user's view of how information should be organized differs from that of the directory's creators, the more difficult it will be for the user to find information in the directory.

Consequently, there is a need for a data extraction tool capable of providing many of the benefits of both search engines and directories, without the drawbacks listed above. For example, there is a need for a tool that could reliably provide a list of highly relevant information locations based on a simple text query. Furthermore, such a tool should provide ready access to the exact location of the information. Preferably, the tool would supply the user with a list of locations or links that can be easily sorted and updated for the convenience of the user. Furthermore, the tool should not require that the user understand the configuration of the tool's internal databases.

In addition to the problems mentioned above, current searching methods are deficient in a number of other ways. Consequently, a more advanced data extraction tool may provide numerous benefits to those desiring to obtain information from a large datastore or database, such as the Internet.

BRIEF SUMMARY OF THE INVENTION

In view of the foregoing, in accordance with the invention as embodied and broadly described herein, a method and apparatus are disclosed in one embodiment of the present invention for determining contexts of information analyzed. Contexts may be determined for words, expressions, and other combinations of words in bodies of knowledge such as encyclopedias. Analysis of use provides a division of the universe of communication or information into domains, and selects words or expressions unique to those domains of subject matter as an aid in classifying information. A vocabulary list may be created with a macro-context (context vector) for each domain, dependent upon the number of occurrences of unique terms from a domain, over each domain. This system may be used to find information or classify information by subsequent inputs of text, in calculation of macro-contexts, with ultimate determination of lists of micro-contests including terms closely aligned with the subject matter.

In one embodiment, databases of information may be mined to determine the macro-contexts and micro-contexts for any constituent size of information element. For example, web pages, groups of web pages, classification trees of web page content, or the like may be mined and analyzed to determine macro-context and micro-context appropriate to each. Thereafter, the database information may be indexed in accordance with the macro and micro-context.

Upon receiving a query from user, the query may be given contexts, both macro and micro-contexts based on the query alone, the query associated with other queries from the same user, the query associated with other information or query results from that user, or other inputs provided to, from, or about the user in order to give context. In one embodiment, the user may actually input documents and ask or request that the search engine find documents like it in subject matter. Ultimately, upon determining the macro and micro-context associated with the query, a search engine may locate in a database information having contexts that relate most closely with the contexts associated with the query. Presentation of such information to a user may be in any format suitable for understanding by a user.

The disclosure of U.S. patent application Ser. No. 11/745,346 filed May 7, 2007 is hereby incorporated by reference.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
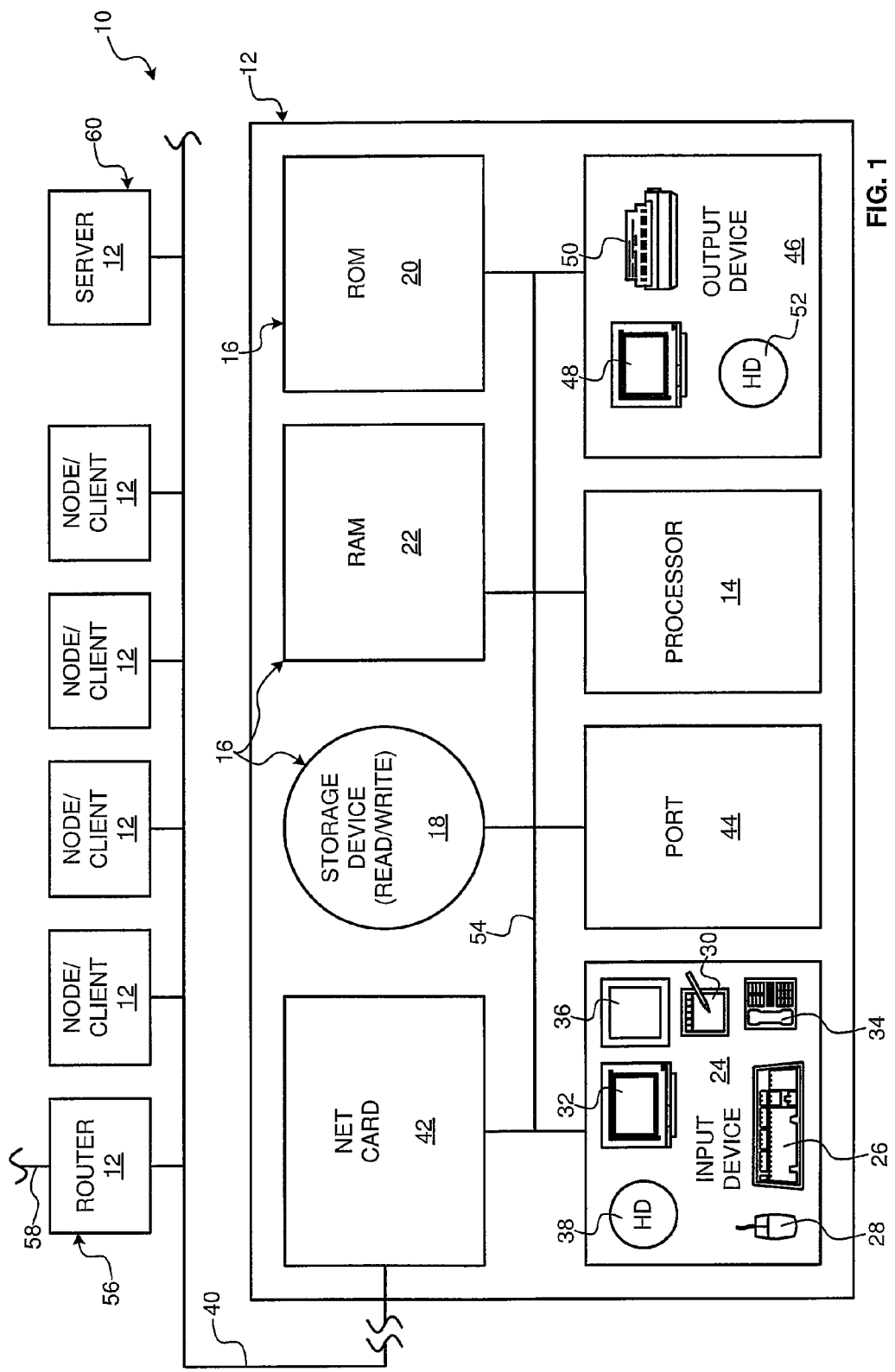
FIG. 1 is a schematic block diagram illustrating a computer system for executing certain methods and processes in accordance with the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, an apparatus 10 or system 10 for implementing the present invention may include one or more nodes 12 (e.g., client 12, computer 12). Such nodes 12 may contain a processor 14 or CPU 14. The CPU 14 may be operably connected to a memory device 16. A memory device 16 may include one or more devices such as a hard drive 18 or other non-volatile storage device 18, a read-only memory 20 (ROM 20), and a random access (and usually volatile) memory 22 (RAM 22 or operational memory 22). For example, memory device 16 may include one or more non-transitory computer readable storage devices. Such components 14, 16, 18, 20, 22 may exist in a single node 12 or may exist in multiple nodes 12 remote from one another.

In selected embodiments, the apparatus 10 may include an input device 24 for receiving inputs from a user or from another device. Input devices 24 may include one or more physical embodiments. For example, a keyboard 26 may be used for interaction with the user, as may a mouse 28 or stylus pad 30. A touch screen 32, a telephone 34, or simply a telecommunications line 34, may be used for communication with other devices, with a user, or the like. Similarly, a scanner 36 may be used to receive graphical inputs, which may or may not be translated to other formats. A hard drive 38 or other memory device 38 may be used as an input device whether resident within the particular node 12 or some other node 12 connected by a network 40. In selected embodiments, a network card 42 (interface card) or port 44 may be provided within a node 12 to facilitate communication through such a network 40.

In certain embodiments, an output device 46 may be provided within a node 12, or accessible within the apparatus 10. Output devices 46 may include one or more physical hardware units. For example, in general, a port 44 may be used to accept inputs into and send outputs from the node 12. Nevertheless, a monitor 48 may provide outputs to a user for feedback during a process, or for assisting two-way communication between the processor 14 and a user. A printer 50, a hard drive 52, or other device may be used for outputting information as output devices 46.

Internally, a bus 54, or plurality of buses 54, may operably interconnect the processor 14, memory devices 16, input devices 24, output devices 46, network card 42, and port 44. The bus 54 may be thought of as a data carrier. As such, the bus 54 may be embodied in numerous configurations. Wire, fiber optic line, wireless electromagnetic communications by visible light, infrared, and radio frequencies may likewise be implemented as appropriate for the bus 54 and the network 40.

In general, a network 40 to which a node 12 connects may, in turn, be connected through a router 56 to another network 58. In general, nodes 12 may be on the same network 40, adjoining networks (i.e., network 40 and neighboring network 58), or may be separated by multiple routers 56 and multiple networks as individual nodes 12 on an internetwork. The individual nodes 12 may have various communication capabilities. In certain embodiments, a minimum of logical capability may be available in any node 12. For example, each node 12 may contain a processor 14 with more or less of the other components described hereinabove.

A network 40 may include one or more servers 60. Servers 60 may be used to manage, store, communicate, transfer, access, update, and the like, any practical number of files, databases, or the like for other nodes 12 on a network 40. Typically, a server 60 may be accessed by all nodes 12 on a network 40. Nevertheless, other special functions, including communications, applications, directory services, and the like, may be implemented by an individual server 60 or multiple servers 60.

In general, a node 12 may need to communicate over a network 40 with a server 60, a router 56, or other nodes 12. Similarly, a node 12 may need to communicate over another neighboring network 58 in an internetwork connection with some remote node 12. Likewise, individual components may need to communicate data with one another. A communication link may exist, in general, between any pair of devices.

Figure 2:
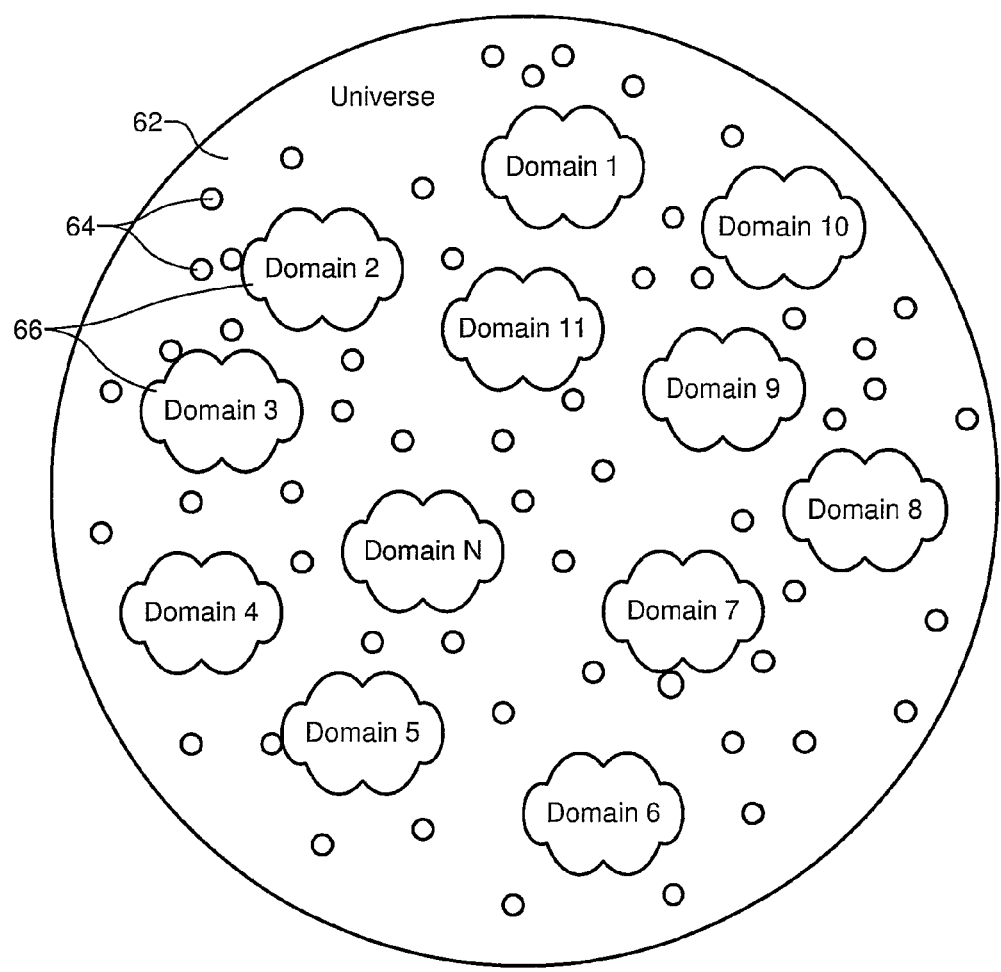
FIG. 2 is a schematic diagram of a universe of communication or information populated by various communication elements and domains of subject matter in accordance with the present invention.

Referring to FIG. 2, a universe 62 of communications exists. The universe 62 of communications has at an atomic level individual words. Words may themselves be terms of art or may be terms having independent meaning. Likewise, words may be combined in expressions that have meaning. Similarly, words may also be combined simply as words to have a meaning constituting a term.

For example, car is a word. Vehicle is a word. Truck is a word. Each of these has meaning. Nevertheless, a car may be an automobile driven by a individual. Likewise, a car may be a railroad car operated by only a railroad. Thus, different words have different contexts which give the individual words meaning.

Likewise, terms may be made from combined words. For example, a Ford car, a touring car, or the like may be a particular type of a car and may have individualized meaning because of the fact that the addition of another word creates yet another term and meaning.

Likewise, when considering expressions, many terms of art, and literary expressions may arise. For example, the expression "last minute" does not literally mean the last minute of anything. It is a figurative expression meaning late in some allocated period of time.

Thus, in general words, terms, expressions, and the like are part of the population of communication elements 64 in the universe 62 of communication. Of course, the universe 62 may expand into phrases, such as clauses of individual sentences or phrases that are longer strings of words having some type of meaning. Likewise, individual sentences may be thought of as a group of assertions or declarations, in which a verb constitutes or represents some type of activity or action, and associated therewith is a nominative actor responsible for the action, and possibly an objective term that represents some thing or person acted upon, or some property or characteristic of the actor tied thereto by the verb.

Above assertions may be entire quotations, or larger textual groups of words. In general, any element of the universe 62 of communications may take on, through a common usage recognized by some group, a meaning that can be recognized, documented, and used in searching, determining context, understanding intended meaning, and the like.

In general, communication elements 64, whether they be from the smallest (atomic) level, or the greatest (macroscopic) level, may exist and do exist in the communication universe 62. Whenever an individual or document uses a particular communication element 64, it is used in a context that will influence how that communication element 64 (e.g., word, term, expression, phrase, assertion, etc.) is to be interpreted.

Interestingly, some words in the English language, and other languages, pertain to many different areas of subject matter. Thus, one may think of the universe 62 of communication as containing numerous domains 66 of subject matter. For example, the various domains 66 in FIG. 2 refer to centers of meaning or subject matter areas. These domains 66 are represented as somewhat indistinct clouds, in that they may accumulate a vocabulary of communication elements 64 about them that pertain to them or that relate to them. Nevertheless, some of those same communication elements 64 may also have application elsewhere. For example, a horse to a rancher is an animal. A horse to a carpenter is an implement of work. A horse to a gymnast is an implement on which to perform certain exercises. Thus, the communication element 64 that we call "horse" belongs to, or pertains to, multiple domains 66.

In a method and apparatus in accordance with the invention, searching for a suitable response to a query submitted by a user to any search engine may be improved substantially over a simple matching of words in the body of information search. That is, in traversing the universe 62 of communications, searching by individual word elements within the communication element 64 reduces a search to the most basic atomic element 64 that can be assembled into communication. Thus, an individual word such as "the" is likely useless in a search. The word is so ubiquitous and adds so little meaning to an expression, that to search for it is to obtain substantially no useful output. Thus, other words or combinations of words that have more significance are more important for searching. Search engines, however, that simply search for groups of words and their existence are still comparatively clumsy and provide numerous results that are not related to the subject matter domain 66 that a particular user seeks. Typical search engines, require a user to continually refine the words used in a query, regardless of the actual subject matter context that the user is pursuing.

In an apparatus and method in accordance with the invention, a search engine process is developed that provides a deterministic method for establishing context for the communication elements 64 submitted in a query. Thus, it is possible for a search engine now to determine to which domain 66 or domains 66 a communication element 64 is "attracted." Since few things are absolute, domains 66 may actually overlap or be very close such that they man share certain communication elements 64. That is, communication elements 64 do not "belong" to any domain 66, they are attracted to or have an affinity for various domains 66, and may have differing degrees of affinity for differing domains 66. One may think of this affinity as perhaps a goodness of fit or a best alignment or quality alignment with the subject matter of a particular domain 66.

Figure 3:
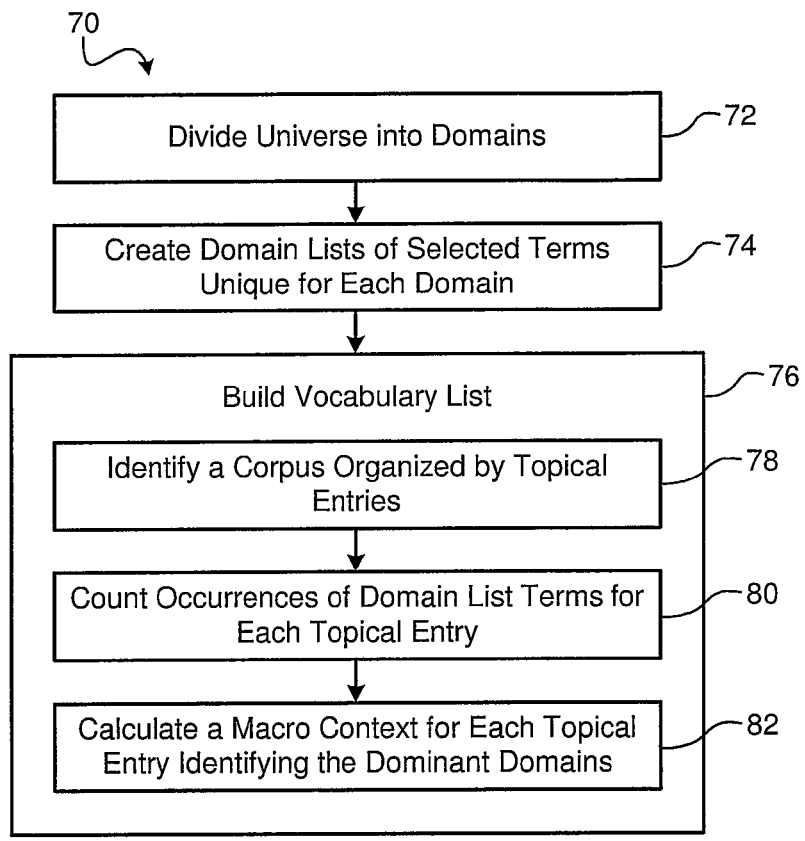
FIG. 3 is a schematic block diagram illustrating a method for determining a macro-context for an expansive set of communication elements in accordance with the present invention.

Referring to FIG. 3, context may be provided for various communication elements 64 in association with various domains 66 by an engine implementing a process 70. Such a process 70 may be performed by or in combination with an apparatus 10.

For example, one may divide 72 a universe 62 or a portion of a universe 62 of communication into various domains 66. Domains 66 may be selected by any suitable mechanism. Certainly every word or every individual communication element 64 is not its own domain. Likewise, dividing the entire universe 62 of information and communication into things plant, things animal, and things inanimate, may not be particular useful. Thus, somewhere between permitting every communication element 64 to be its own domain, and dividing the entire universe 62 of information and communication into three domains, one may select a degree of granularity that will be both computationally effective for searching, and contextually rewarding. In one embodiment of an apparatus and method in accordance with the invention, it has been found that a number of domains 66 on the order of about 100 or more has been found computationally effective and contextually rewarding for comparatively rapidly searching.

By contextually rewarding is meant that the information to which the user is directed, or the information provided back in response to a query is comparatively closely related. Most contextually rewarding would be that information exactly which has been sought. Nevertheless, a little less contextually rewarding, but still useful would be information that is in the area and can still be useful. Contextually unrewarding would be information that shares the word in a completely different and useless context related to the query. The subject matter of domain 66 may include things like medicine, geographic regions of the world, sports, education, common activities, and the like.

Thus, once the universe 62 has been divided into some set of domains 66, one may create 74 domain lists of selected terms unique to each domain 66. That is, it has been found that although numerous words and other communication elements 64 serve double or other multiple duty for various domains 66, each domain 66 may have certain communication elements 64 that are substantially unique to itself. For example, in medicine, oncology is a field relating to cancer. Such a term does not have ubiquitous use in any field outside medicine. However, within the domain 66 of medicine, the word is used frequently.

This is another useful characteristic, frequency. That is, a communication element 64 such as an individual word or expression that is used frequently, and exclusively within a particular field or subject matter domain 66, is particularly well suited for selection as one of the domain list terms.

Typically, a domain list of about 40 to 50 terms have been found to be effective. Some domain lists have been operated successfully in an apparatus and method in accordance with the invention with as few as 10 terms. Some domain lists may contain a few hundreds of individual terms. For example, some domains 66 may justify about 300 terms. Although the method 70 is deterministic, rather than statistical, it is helpful to have about 40 to 50 terms in the domain list in order to improve the efficiency of the calculations and determinations of the method.

The domain lists have utility in quickly identifying the particular domain 66 to which their members pertain. This results from the lack of commonality of the terms and the lack of ambiguity as to domains 66 to which they may have utility.

By the same token, a list as small as the domain lists are necessarily limited when considering the overall vocabulary of communication elements 64 available in any language. Thus, the terms in domain lists do not necessarily arise with the frequency that is most useful for rapid searching. That is, a word that is unique to a particular subject matter domain 66, but infrequently used, may not arise in very many queries submitted to a search engine.

A process 76 for creating a vocabulary list of a substantial universe 62 or a substantial portion of a universe 62 of communication elements 64 may be performed by identifying 78 a body or corpus of information organized by topical entries. Thereafter, the text of each of those entries identified 78 may be subjected to a counting process 80 in which occurrences of terms from the domain list occur within each of the topical entries. Ultimately, a calculation 82 of a macro context may be made for each of the topical entries. This calculation is based on the domain lists, and the domains represented thereby.

To identify a body or corpus of information, one may look to various reference books. For example, an encyclopedia of computer terms may provide a vocabulary for people dealing in that particular portion of the universe 62. Likewise, a general encyclopedia of public knowledge may be considered a corpus. Similarly, a dictionary has a certain aspect of organization in a regular format by topical entries. Nevertheless, a dictionary may be somewhat antithetical to the concept of body of knowledge in that the entries are typically very short, and many and each is a different context.

For processing, an apparatus 10 (e.g., computer 10, computer network 10) may look for words. Accordingly, the corpus of information may be converted to some type of a digital format. For example, a digital copy of a document, a digital on-line encyclopedia, a digital reference book, or the like may form a corpus of interest.

Counting 80 may be done by an apparatus 10 simply searching for terms found in the domain lists of the domains 66 into which the universe 62 has been divided. The terms may be individual words, terms, expressions, phrases, and so forth. Likewise, an individual word may be reviewed and counted as a word, and also counted in a expression. Similarly, in an assertion such as a subject, verb, and object, each individual word may be counted as a word.

Likewise, the assertion, if it has formed a term found in a domain list, may also be treated in its entirety as an element 64 to be counted.

Counting, in one embodiment of an apparatus and method in accordance with the invention may involve selecting the topical entry, and for that entry, identified by the title, or expression being described, counting the occurrence of every term from every domain list available. Once the count has been made for an entry, a calculation 82 of the macro context for that entry may be made.

One may think of a topical entry as a vocabulary term. That is, every topical entry is a vocabulary word, expression, place, person, etc. that will be added to the overall vocabulary. That is, for example, the universe may be divided into about 100 to 120 domains 66 for convenient navigation. Likewise, the domain lists may themselves contain from about 10 to about 300 select terms each. By contrast, the topical entries that may be included in the build 76 of a vocabulary list may include the number of terms one would find in a dictionary such as 300,000 to 800,000. Less may be used, and conceivably more. Nevertheless, unabridged dictionaries and encyclopedias typically have on this order of numbers of entries.

Figure 4:
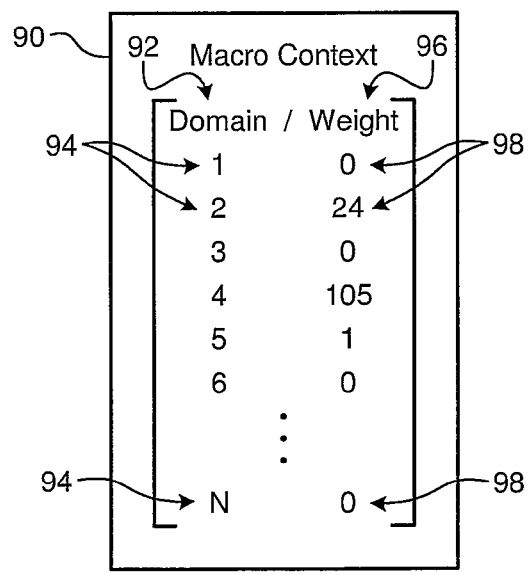
FIG. 4 is a schematic block diagram illustrating one embodiment of a macro-context matrix or vector in accordance with the present invention.

Referring to FIG. 4, a macro-context 90 may be represented as a vector 90. One may also think of the macro-context 90 as a set of ordered pairs. That is, for a first category 92, every individual domain 66 identified may be listed. Thus, the individual entries 94-17-correspond to the different domains 66 into which the universe 62 has been subdivided. The second category 96 is an occurrence or a weight 96. Thus, each individual entry 98 represents a weighting for a particular domain entry 94. The resulting matrix is one example of how to create a macro-context 90. In this embodiment, in accordance with the invention, all of the domains 66 are represented by numbers 1,2,3,4,5, etc, in the entries 94. The weighting entries 98 represent the number of occurrences of the domain list words or terms created in the creation step 74. As a practical matter, the total number of occurrences of all domain list terms from a particular domain 66 are represented in a single entry 98. Actually, every single domain list term could be listed in a matrix of weights 96 in the macro-context 90. However, this adds much additional computation later, and actually can inhibit rapid searching. That is, by narrowing the granularity to a too-fine level of scrutiny, searching may be less likely to find or match a particular domain 66. Moreover, computations go up geometrically with the number of elements that must be processed. In the simplified approach illustrated in FIG. 4, the macro-context 90 may be readily calculated by a series of simple weighting entries 98 corresponding to respective domain identifiers 94.

Moreover, the macro-context 90 may be further reduced by limiting the particular entries 94 or domain identifiers 94 to the top 10 or 20 weight values 98. Accordingly, zeros would disappear, and the highest numbers in the entries 98 would be selected. In one embodiment, the greatest ten weights 98 and their associated domain numbers 94 are laid into a vector or matrix. If one thinks of all the domain numbers 94, then the weights 98 may be a vector, in that all the domain numbers are identical, and complete, and the matrix is sparsely populated by the top ten values of weights 98, and all other weights are set to zero. That is, a macro-context 90 may be thought of as a weight vector 96 including the weight for every available domain number 94. Meanwhile, the weight vector 96 is a sparse matrix or sparse vector in which all values are set to zero except the greatest ten or other number of entries 98.

In the example of FIG. 4, the domain 66 associated with the domain identifier "1" has no term from its domain list occurring in the topical entry identified in the macro-context 90. The domain 66 identified by domain identifier "2" has 24 total occurrences of domain list of terms. This number of 24 may represent a single term multiple times, 24 separate terms from the domain list each occurring once, or any combination there between. Thus, each occurrence of each term may be counted as a weight value of 1. Other weighing schemes may be used in accordance with mathematical theories available for numerical methods. For example, each term could be given a weight. Nevertheless, such complexities have not been found to be necessary, and computational speeds are improved by simplicity.

For each topical entry or vocabulary term, a macro-context vector 90 may be created. Thereafter, the unique vector for that entry may be used by applying it to various inputs provided by searchers. In general, an input may be from any source. Typically, an input may result from the terms of a query. Nevertheless, an input may also be not only the terms or words used in a query, but an extensive discourse or free-form paragraph describing what a person is searching for. Likewise, inputs may include all previous text inputs from a particular user.

Likewise, an input may include information to be characterized or classified. That is, a query from a searcher is classified in order to select information qualifying to respond to the query. By the same token, additional resources on the Internet may be classified and serve as responses to be delivered.

Figure 5:
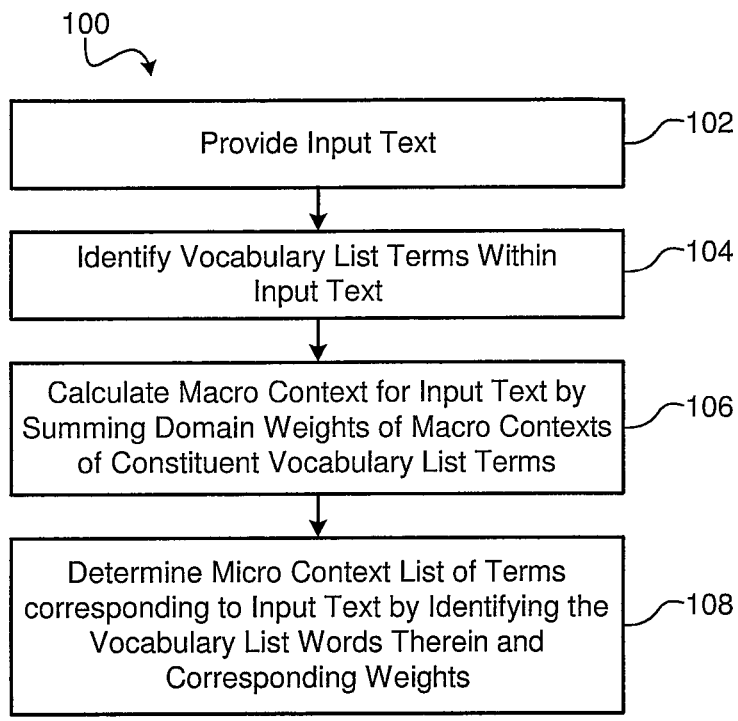
FIG. 5 is a schematic block diagram illustrating a method for determining the macro and micro-contexts of an input text in accordance with the present invention.

Referring to FIG. 5, a process 100 for determining context of an input may include providing 102 some type of input. Typically, the input will be provided 102 as text. That is, a digital string of characters that may be processed. Typically, since human beings communicate in language, information is typically predominantly text corresponding to words, with interspersed numbers and the like. Thus, providing an input text 102 may include providing the body of a web page to be characterized, providing a query from a user to be responded to, providing the entire query history of a user in order to provide some indication of the proper context for responding to a current query from a user, or the like. Likewise, a user could be characterized by not only the previous queries submitted by that user, but by the responses to previous queries of that user.

In one embodiment of an apparatus and method in accordance of the invention, a user may browse the Internet. Browsed pages may be provided 102 for evaluation, along with the queries that gave rise to those pages. Thus, one may either classify information that will eventually be searched (e.g., providing 102 input text corresponding to something published on the internet), or may classify information associated with a searcher.

An identification step 104 may create a vocabulary list of terms from the input text. For example, the input text provided 102 may be parsed to find individual communication elements 64 such as words, terms, expressions, phrases, and the like that occur within the inputs provided 102. In order to recognize that a communication element 64 is a recognized term of some type, that communication element 64 must exist in some recognizable form. That is, string matching may be done. However, in an apparatus and method in accordance with the invention, one method for providing useful identification of terms is to compare the various communication elements 64 with the vocabulary list that was provided during the build process 76. Thus, all the occurrences of any communication element 64 within the list resulting from the vocabulary build 76 may be identified for its occurrence within the input text.

Once the individual terms have been identified, then a calculation 106 may calculate the macro-context for the input-text. In contrast to the building process 76, in which the macro-context 90 was created for each vocabulary entry, the calculation step sums the domain weights 98 from the macro-context vector 90 of each of the terms from the input text, according to those terms macro-contexts 90 in the original vocabulary list. Accordingly, in one embodiment, the macro-context of an input may be a composite superposition or addition of the weights 98 of the macro-context vector 90 for all of the terms from the vocabulary list found in the input text.

Another way to think of the calculation step 106 is that one may add all the macro-context vectors 90, and particularly the weight vector 96 for each term out of the vocabulary list from the build 76 that has been found within the input text provided 102. These vectors may be thought of as sparse vectors 96 in which some of the weights are zero and some have values. As discussed above, for example, the vectors 96 corresponding to the various vocabulary terms from the build 76 that appear in the text provided 102 may be lined up and have the top ten weights 98 valued and all other weights set to zero. Accordingly, once lined up, all the vectors may be added to provide a new vector with all of the summed values for all of the weighting entries. Thus, the macro-context vector 90 corresponding to the input text provided 102 is this new summation vector. Thus, one may determine or calculate 106 a macro-context 90 corresponding to the input text provided 102.

In some instances, various strings of characters may exist in an input text provided 102 that do not match any vocabulary entry from the build 76. According, these will not affect the calculation. Such terms may include, for example, long strings of numbers. Likewise, foreign words not in common usage may be included. Likewise, various grammatical construction terms such as definite and indefinite articles may be filtered out or not included in the calculation, as being words that are too ubiquitous to be significant in any domain.

The process 100 may then use a deterministic mathematical process for determining a micro-context. A micro-context may be a list of terms selected from the vocabulary list created in the build 76. The list of terms is constructed by determining 108 the entries from the vocabulary list in the build 76 that are most closely aligned with the input text provided 102. This may be done in one of several ways. For example, the weight vector 96 or any term of the vocabulary list may be multiplied (e.g., as a dot product) by the macro-context 90 of the input text. This may be done for each of the vocabulary entries found in both the input text and vocabulary list.

Various numerical methods may be used for comparison. One method may be to simply multiply the macro-context vector for the input text provided 102 against that of each of the terms in the vocabulary list that are found therein. If desired, this may be normalized by dividing by the multiplication of the weight vector 96 or macro-context 90 of the vocabulary entry against itself. Other types of fit routines, comparison routines, correlation routines, and the like may be used in order to determine which vocabulary entries from the build 76 provide the highest values of the dot product from multiplication value of the two vectors. Accordingly, those vocabulary entries that have the highest values may be provided in a list. In one embodiment, determining a micro-context list involves selecting the best aligned or highest valued correlations to pick the most closely aligned vocabulary entries for the list of the determination step 108. Typically, it has been found in one embodiment of an apparatus and method in accordance with the invention that 256 most closely aligned vocabulary entries, identified with associated weights, form a suitable micro-context for the input text provided 102.

Figure 6:
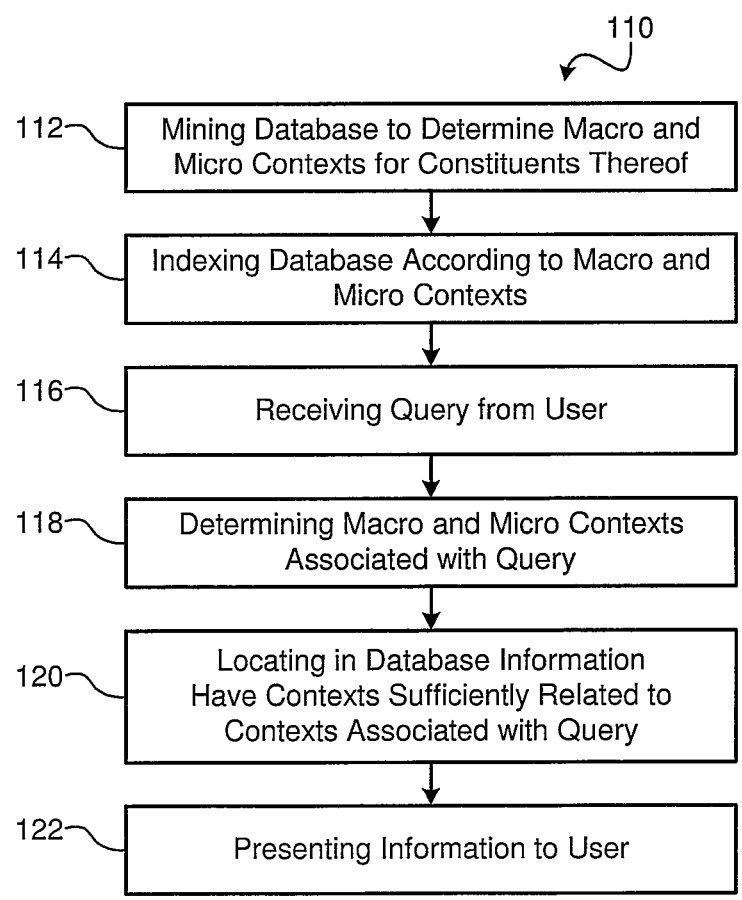
FIG. 6 is a schematic block diagram illustrating a method for contextually searching a database.

Referring to FIG. 6, a process 110 or method 110 for searching a database of information may include mining 112 a database or other repository of information to determine macro-contexts and micro-contexts for constituent elements thereof. For example, any constituent element of a database or information repository may simply be an identifiable portion thereof. In a database, a constituent may be a record. In a record, a constituent may be a particular field of text. Nevertheless, in a database, a record may be a particular level. For example, the Internet contains a great amount of information simply published on individual web pages. Thus, a web page, a web site, or a group of web pages grouped on a web site under a particular heading may all be considered a particular input text to be provided 102 as a recognizable entity. Thus, for example, an apparatus and method in accordance with the invention may characterize a web page, a group of web pages within a particular sub-category on that web site, or the entire web site in accordance with the processes disclosed hereinabove.

Following mining 112 of information, indexing 114 may involve sorting, classifying, filtering, or otherwise organizing information according to values of the macro-contexts thereof, or according to the word lists or terms lists found in micro-contexts. For example, content mined 112 may be organized according to all the micro-context terms that have the highest values. For example, the highest 10, 20 or 256 terms used may all be tags under which such a content would be indexed. Likewise, content from a location that has been mined 112 may be indexed 114 according to the shape and values of entries 98 in the macro-context vector 96.

Upon receiving 116 a query from user, the process 110 may determine 118, the macro-context and micro-context associated with the query. The query itself may be used as an input text 102 as described above in order to determine those contexts. Alternatively, all the queries submitted previously by that particularly user may also be included as input text provided 102 in order to determine 118 those contexts. Also, as described herein above, browsing results or search results previously provided in a response to queries from the user may all be used as part of the input text provided 102 in order to associate with the query some appropriate context. In one embodiment, a user may even donate to a search engine other material for which the user desires like information. This may include articles, web pages, or other information that the user has in digital format for submission to the process 110 in order to indicate that more of this type of material is desired.

Locating 120 in a database of information entries or information that has a context sufficiently related to the context associated with the query may be done by any simple method. For example, macro-contexts and micro-contexts for a query may be compared and matched. Once located, such information may be presented 122 to a user.

Example Embodiment I

This embodiment of the invention relates to the field of on-line advertising, especially as it relates to personalization and sense analysis for advertisers' web sites. A big problem with the pay-per-click models used in online advertising is that they can be spoofed by people who are interested in costing online advertisers money instead of finding out more about their products. The present invention provides a system to certify that the user who is clicking though on the ad or link actually has a history of looking at similar domains in the past. With this history, or personalization profile, the user interaction rises to the level of "certified click."

Every online advertisement has a destination URL (Uniform Resource Locator). Each of these URLs can be semantically classified using a numerical vector (macro-context 90) that specifies membership in each of some number N of domains 66. For this embodiment, a domain 66 may be defined as a partition of some semantic space of interest, where the partition is defined using an enumeration of semantic entities (domain list entries) that occur exclusively or primarily in that part of the overall space. A URL can be considered to belong strongly to that domain 66 if it contains a significant number of the semantic entities that make up that domain 66. Conversely, a URL would be considered to belong weakly or not at all to a domain 66 if it contained few or none of the semantic entities used to define that domain 66.

Similarly, a person can be assigned a membership vector to the same set of domains 66 simply by examining that person's search and click history. Since every URL or even entire web site can be assigned a vector (macro-context 90), assigning a person a similar vector is accomplished by combining the vectors from the sites they visit in some way. This combination could occur in many different ways, including (but not limited to) averaging, averaging with hysteresis, weighted combination, or noise-adding averaging. This vector created for a person may be called a "personalization vector."

With a personalization vector and a vector for every web site. The user's personalization vector and a site's vector can be multiplied together using a dot product, a weighted dot product, or some other method, resulting in a match value M. The advertiser can select a matching threshold T, where if a user coming into the target site (e.g., if the user selecting the online advertisement and entering content associated therewith) has an M that exceeds T, a certified click is generated. This certified click may motivate greatly increased ad rates for the hosting site, or may be used to measure other things relating to marketing effectiveness.

Systems in common use today capture only the number of clicks made on an ad link, or at best the number and source of those clicks. The back end of this embodiment of the invention may measure all this as well as the quality of each click. Using tagging measures, a correlation may be developed between the conversion rate at the target site and the click quality from the tagged sources. Modifications to the matching function may then be made using a procedure similar to one layer back propagation in neural networks, allowing optimization for any set of domains 66. A side effect of this is that it is possible to measure the utility of each of the domains 66 selected for the semantic space based on the weights found for each domain after the propagation phase.

This embodiment of the invention gives the user a new way of measuring the quality of visitors to the user's website, where quality is a measure of the match between a visitor's demonstrated interests and the content of the web page. It relies on three constructs namely, partition of a semantic space into a set of domains 66, definition of those domains 66 in terms of semantic entities, and a mechanism to construct and maintain a picture of a given user with respect to one of more sets of domains 66.

Partitioning a semantic space into a set of domains 66 may be a manual process. To do this, a domain expert may delineate the semantic loci in the space. Mathematically speaking, it does not matter what the domains 66 are called or even what their relative size is in terms of a random training set being assigned as members. It only matters that a partition is made that can be well-separated with a finite list of semantic entities, such that any semantic entity is a member of a very small fraction of the domains 66 and each domain 66 has many such entities.

Semantic entities can be anything from simple keywords to semantic constructs, which are assertions that are made up of simpler entities tied together with rules. The only constraint on a semantic entity is that it can be extracted from some sequence of combinations of raw text. In most cases, the set of semantic entities used to represent a domain 66 is derived from a list of master assertions commonly answered by text in the domain 66. For example, if the domain 66 in question is Breast Cancer, one question that is commonly answered is what stage of cancer a patient is generally at. By compiling a list of domain-specific questions, it is possible to (1) specify differences between very similar domains 66 with great precision, and (2) create a rapid way to prototype a domain 66 that does not require many hours of an expert's time, and can be expanded by relatively inexperienced people.

Where it is only necessary to classify a piece of text rather than extract actual values for the assertions in the domain 66, the master assertions can be "factored" into their simplified descendants and those which are common to a large percentage of the domains 66 in question can then be removed, leaving (mostly) a list of keywords and phrases to define a domain 66. This speeds the comparison and classification processes tremendously.

The mechanism to create and maintain a domain-based picture (or sense-based picture) of a user can be as simple as a cookie stored on the user's machine that is used to update a user vector stored in a central database. This may only function when the user is surfing through sites that participate in the personalization system. Another slightly more complex implementation is something like a Browser Helper Object (BHO) that runs on the user's machine and watches, categorizes, or both watches and categorizes all surfing activity. With this system, even non-participating sites can contribute to the picture of the user, and any clicking the user does to ad sites served by certified clicks will pick up a much more comprehensive picture.

In certain embodiments, the system starts with zero knowledge about the user. When the user begins browsing, either through a participating site or by initializing the BHO, a new record is created in the database for that user. Every time the user clicks on a link, the contents of the returned page are used to update the picture of the user in the manner summarized above. The user may control the image being built up, or may even create multiple images of him or herself and select which image is presented as the current valid representation of the user's state. These images, or "aspects," represent the different roles that a given person might take on during the course of time. For example, a person might have a business aspect, wherein they are looking for things like printers, software, and computers, and a vacation aspect, where they are searching for good tours through Chile and Argentina. Once aspects are created by the user, browsing activity can be automatically assigned to the correct aspect simply by doing a global domain count match between the current site and all available aspects. Similarly, the user's current aspect or role can be inferred from the sites being browsed.

Updating of aspects or core personalization attributes can happen each time a different site is visited, or on a more delayed basis (in the case where the user is running the BHO). Historical data may be maintained. However, in selected embodiments it may not be needed as the hysteresis may maintain an implicit history.

Sites that implement a certified clicks program need only query the central database to resolve the identity of a user's aspect and verify a sufficiently close match. The provided information can be additionally used to customize the receiving site for the incoming user, based on ancillary interests the user might have.

Example Embodiment II

This embodiment of the invention relates to the field of text processing, specifically to the fields of semantic analysis and text classification. Semantic analysis of a block of text has the primary goal of extracting meaning, or manipulatable assertions, from the combination of words that make up the text. The extracted assertions may not be explicitly present in the text, and may need to be inferred from a body of prior experience. One of the most important problems that must be solved before non-explicit assertions are made about the text is that of domain identification. The present invention addresses that problem.

A domain 66 can be defined as a set of base assertions that apply for a given situation, for example, when we are talking about music, we can state that notes, rests, harmony, and other music-related rules are important. We can talk about artists, songs, and genres. We can assume that the rules and constraints of the music publishing industry are important. In short, before the first word of the text is processed, we can state many facts with certainty and ask many questions, the answers to which may or may not be found in the text.

Solutions to the domain identification problem fall into several categories. Keyword-based solutions, mathematical or statistical solutions, and rule-based solutions are the primary categories. Keyword solutions are probably the most commonly used. Domains 66 are represented by lists of keywords or key phrases that are more likely to occur in that particular domain 66 than in any other domain 66. By explicitly specifying a domain 66 through the use of manually selected keywords, a relatively good approximation to the domain 66 may be achieved, unless discrimination is being attempted between two different domains 66 that share the same vocabulary (without regard to meaning).

Mathematical and statistical solutions rely on properties of large sets to provide an automatic discrimination function between domains 66 of interest. These types of solutions require the user to pre-classify blocks of text, often numbering in the thousands. These pre-classified blocks of text are then used as a training set for the system. Statistical calculations are run against all possible tokens and phrases, and those with the highest discrimination value are retained for use in classifying future inputs. Rule-based solutions require manual construction of rules, which are run against the blocks of text to be classified. When enough rules are satisfied in a given domain 66, the block of text is assigned to that domain 66. Assignment may occur to multiple domains 66, or to the domain 66 that satisfies the most rules.

One problem of the existing systems is that domains 66 simply cannot be specified with sufficient precision to allow discrimination between two arbitrarily close domains. For example, if users require text domain segmentation between two types of computer programming message boards, where one deals with databases and the other deals with networks, both boards will use almost all of each other's keywords and key phrases.

Similarly, mathematical approaches will not be able to automatically find discrimination functions because of the low granularity of the domain space.

A second and more significant problem is the large degree of manual intervention required to create a single domain 66 in many of the stated approaches. Experts that know the domain are required to painstakingly select pertinent phrases in the keyword approaches, or manually discriminate between every text fragment in the training sets in the mathematical cases.

Present embodiment of the invention gives the user a new way of specifying domains 66 that is much more efficient than the existing methods. A significant effect of this new method of representation is the creation of a new way of representing the domain 66 itself, as a set of slots to be filled, rather than a list of rules or keywords.

The domain representation system uses a list of assertions commonly answered by text in the domain 66 to specify the domain 66 itself. For example, if the domain 66 in question is Breast Cancer, one question that is commonly answered is what stage of cancer a patient is generally at. By compiling a list of domain-specific questions, it is possible to (1) specify differences between very similar domains 66 with great precision, and (2) create a rapid way to prototype a domain 66 that does not require many hours of an expert's time, and can be expanded by relatively inexperienced people.

Verifying whether or not a block of text answers a specific question is a task for extractors. Extractors are a hierarchical rule-based system in the form of a DAG whose leaf nodes consist of simple token identifiers, whose middle level nodes consist of token combination operators, and whose top levels consist of assertion generators. When text is input to this system, it is broken up into a sequential list of tokens which activate the leaf nodes of the extractor system. Those leaf nodes then activate higher level nodes using a neural network-like system of activation thresholds and mutual enhancement/suppression links. That process continues until no further nodes are activated or suppressed. The result is a representation of the text in assertion form, which can then be matched to the list of assertions previously generated for each domain 66 of interest. The domain 66 with the most slots filled by the generated assertion is selected as the domain 66 for the text, and the unfilled slots in the domain list can be iteratively filled by pushing back down through the assertion graph and inferring vacant nodes from the master domain 66.

An important part of this embodiment of the invention is the processing of text through the extraction DAG and the matching of the generated assertions with the core domain assertions. The user supplies a specification of the domain 66 using a piece of software that outputs those assertions in a normalized format. One such specification is where assertions are specified as declarative sentences, and users designate the name of the assertion and the value slot using the programmatic interface. The assertion name is inserted into a database for use by the extractor builder.

The extractor builder is another piece of software that allows the user to select from the list of assertions for all domains 66 and create relationships between tokens that designate both the existence of the assertion in a block of text as well as the format and location of the value needed to complete the assertion. Such relationships may include, but are not limited to adjacency, font size, paragraph length, verb type coexistence, voice, tense, keywords, key phrases, or numerical values. Users can also specify exceptions to these relationships, and use modifications against existing relationships to create new relationships in the extractor structure.

Once a domain 66 and an extractor structure are fully specified, the system can be run against arbitrary blocks of text. The text is stripped of all unneeded information and all possible nodes in the extractor structure are activated. The result is a list of assertions with associated values. The domain 66 with the most active assertions is reported as the selected domain 66. Those assertions which belong to the selected domain 66 provide their extracted values as the extracted semantic content for that block of text. The next step is to infer additional semantic content to the block of text by force-activating all remaining assertions in the domain 66 and looking for unused values at the token level that are not prohibited by extractor structure rules from filling those slots.

One aspect of the present embodiment of the invention is extraction of factual and emotional content from on-line message boards and blogs. The system can be programmed to seek out internet sources that belong to a given domain 66, and then extract information of interest to that domain 66 and insert the results in a conventional database. These results can then be used to generate reports for marketing, brand identification, or other purposes. They can also be used to measure the effectiveness of ad campaigns or the effect of news stories about certain products or events. Demographic analysis can be accomplished, where demographic extractors are supplied with the domain 66.

Example Embodiment III

A major feature now being used in online marketing is that ads are delivered to the potential customer via search engines by their association to key words being used in the user's search query. Recent technology advancements in search render this technique obsolete, as the newer search technology utilizes semantic domains in addition to keywords to deliver results to users. Ads linked solely to keywords cannot make use of this additional information because the information acts as an additional dimension to keyword. However, users are accustomed to using certain key words and phrases to link their products to users. Also, not every user query comes with semantic information, so provision must be made for integrating these old-style queries with the new.

The present embodiment of the invention provides a system to allow accurate pricing of keywords where semantic information may or may not be present. The concept of "bid density" in semantic as well as keyword space is introduced. The present embodiment allows a "fuzzy match" to a keyword through semantic space, so that a price may be determined for a word that does not yet have a bid, as well as for a semantic subdomain that has not yet been specifically selected. The user does not need to explicitly search for a subdomain or even a specific word. The desired target can be arrived at based on an aggregate of past user behavior.

Every online product has a home URL. Each of these URLs can be semantically classified using a numerical vector (e.g. macro-context 90) that specifies membership in each of some number N of domains 66. For this invention, a domain 66 can be defined as a partition of some semantic space of interest, where the partition is defined using an enumeration of semantic entities (domain list entries) that occur exclusively or primarily in that part of the overall space. A URL can be considered to belong strongly to that domain 66 if it contains a significant number of the semantic entities that make up that domain 66. Conversely, a URL would be considered to belong weakly or not at all to a domain 66 if it contained few or none of the semantic entities used to define that domain 66.

Similarly, a person can be assigned a membership vector to the same set of domains 66 simply by examining that person's search and click history. Since every URL or even entire web site can be assigned a vector, assigning a person a similar vector is accomplished by combining the vectors from the sites they visit in some way. This combination could occur in many different ways, including (but not limited to) averaging, averaging with hysteresis, weighted combination, or noise-adding averaging. This vector created for a person may be called a "personalization vector."

With a personalization vector and a vector for every web site, fuzzy semantic auctions may be implemented. A web marketer selling a given product (who would normally bid on a set of words) may now supply those words with the URL of the product being sold. The system determines the correct semantic subdomain by using the vectorization described above. The price for the words is now determined by looking at the current values of three things: (1) the latest purchases in the subdomain of the product and adjacent subdomains (where weights decrease as distance increases); (2) the latest purchases of other words in the subdomain; and/or (3) the latest purchases of the supplied words in distantly related subdomains.

By combining the rates calculated by these three approaches, the extent of accurate pricing throughout semantic space may expand with only a few concrete price points. When prices are requested without supplying semantic information, a generic semantic vector can be inferred from previous purchases of the words that did have accompanying semantic information. Where no such information exists, the procedure may collapse to a conventional auction (as no fuzzy inferences may be made).

Systems in common use today capture only the number of clicks made on an ad link, or at best the number and source of those clicks. The back end of the present embodiment measures all this as well as the users semantic alignment with the site being clicked on. Using simple tagging measures commonly utilized today, a correlation can be developed between the conversion rate at the target site and the click quality from the tagged sources. Modifications to the fuzzy auction semantic mapping function can then be made using a procedure similar to one layer back propagation in neural networks, allowing optimization for any set of domains 66. A side effect of this is that it is possible to measure the utility of each of the domains 66 selected for the semantic space based on the weights found for each domain 66 after the propagation phase.

The invention gives the marketer a new way of more tightly targeting purchases of ads based on keywords. Marketers can now refine their purchasing requests with the semantic domain of their sites. Users are then matched to ads by their past behavior or by explicitly constructed aspects. The invention relies on three constructs, namely, partition of a semantic space into a set of domains 66, definition of those domains 66 in terms of semantic entities, and a mechanism to construct and maintain a picture of a given user with respect to one of more sets of domains 66.

Partitioning a semantic space into a set of domains 66 may be a manual process. To do this, a domain expert may delineate the semantic loci in the space. Mathematically speaking, it does not matter what the domains 66 are called or even what their relative size is in terms of a random training set being assigned as members. It only matters that a partition is made that can be well-separated with a finite list of semantic entities, such that any semantic entity is a member of a very small fraction of the domains 66 and each domain 66 has many such entities.

Semantic entities can be anything from simple keywords to semantic constructs, which are assertions that are made up of simpler entities tied together with rules. The only constraint on a semantic entity is that it can be extracted from some sequence of combinations of raw text. In most cases, the set of semantic entities used to represent a domain 66 is derived from a list of master assertions commonly answered by text in the domain. For example, if the domain 66 in question is Breast Cancer, one question that is commonly answered is what stage of cancer a patient is generally at. By compiling a list of domain-specific questions, it is possible to (1) specify differences between very similar domains 66 with great precision, and (2) create a rapid way to prototype a domain that does not require many hours of an expert's time, and can be expanded by relatively inexperienced people.

Where it is only necessary to classify a piece of text rather than extract actual values for the assertions in the domain, the master assertions can be "factored" into their simplified descendants and those which are common to a large percentage of the domains 66 in question can then be removed, leaving (mostly) a list of keywords and phrases to define a domain 66. This speeds the comparison and classification processes tremendously.

Using this list of keywords that are primary members of only a few domains 66, the mechanism to generate a virtual bid for a previously unsold word can be as simple as looking for matches in the primary lists that correspond to the requested domain 66 of the virtual bid. This only functions when semantic information is supplied or is inferred from the supplied word (in that the word in all its senses is not a member of a large number of subdomains).

The system may start with zero knowledge about word and domain values. As bids are made by actual users for words, words inside of specific domains 66, or entire subdomains, value points are established in semantic space. These points allow determination of value throughout the subdomain they occupy and across other domains 66 that share components of that subdomain. Value is determined by a weighted function of the number and type of established points in any subdomain. In this fashion, an actual bid for a single word/domain combination transforms into a virtual bid for hundreds or thousands of words. Where users elect, these can be used as actual bids and ads can be linked to these semantically related words even though the user never specifically requested one of the related words in the initial bid. As consumers click on the ads provided by the alternate words or phrases, links between them and the primary bid word are strengthened and the weighting function is altered to correctly reflect the new value structure.

Sites that implement a semantic auction program need only query the central database to resolve the weighting function and verify a sufficiently close match. The sites can also provide information can be used to update the weighting function.

Example Embodiment IV

A big problem with the coupon delivery models now being used in online marketing is that they are delivered to the potential customer via search engines by their association to key words being used in the user's search query. Alternatively, the user may navigate to a specific site to retrieve a coupon from that site should one be available that meets their buying interests. The result is an inefficient delivery method for the advertiser to provide a promotional coupon to an interested customer. This process is costly and can be spoofed by people who are interested in costing online advertisers' money instead of obtaining coupons that may be used in the purchase of a vendor's product. This is a manual process that depends on the user's interaction with key word based search engines since the user must physically input the request into the search engine, or type in the URL of a specific website to arrive at a desired location on the Web.

The present embodiment of the invention provides a system to certify that the user to whom a promotional advertising coupon is being delivered by the search engine actually has a past history of looking at similar domains 66 that relate to the coupon being offered. With this history, or personalization profile, the user interaction rises to the level of a "certified coupon delivery." Once the certified coupon is delivered by use of the sense-based search technology the coupon may be either printed out in a hard copy or the coupon offer may be electronically downloaded onto the user's credit card for redemption at a physical brick and mortar store. In this embodiment, the user may not need to explicitly search for the coupon. It may be delivered based on an aggregate of past user behavior.

Every online advertisement has a destination URL. Each of these URLs can be semantically classified using a numerical vector (macro-context 90) that specifies membership in each of some number N of domains 66. For this invention, a domain 66 can be defined as a partition of some semantic space of interest, where the partition is defined using an enumeration of semantic entities (domain list entries) that occur exclusively or primarily in that part of the overall space. A URL can be considered to belong strongly to that domain 66 if it contains a significant number of the semantic entities that make up that domain 66. Conversely, a URL would be considered to belong weakly or not at all to a domain 66 if it contained few or none of the semantic entities used to define that domain.

Similarly, a person can be assigned a membership vector to the same set of domains 66 simply by examining that person's search and click history. Since every URL or even entire web site can be assigned a vector, assigning a person a similar vector is accomplished by combining the vectors from the sites they visit in some way. This combination may occur in many different ways, including (but not limited to) averaging, averaging with hysteresis, weighted combination, or noise-adding averaging. This vector created for a person may be called a "personalization vector."

With a personalization vector and a vector for every web site, certified coupons may be implemented. The text of a coupon, taken together with a URL that describes the referenced product, can be considered to be a single URL (for which a vector can be generated). The user's personalization vector and a coupon's vector can be multiplied together using a dot product, a weighted dot product, or some other method, resulting in a match value M. The advertiser can select a matching threshold T, where if a coupon has an M that exceeds the T, a certified coupon is generated. This certified coupon may motivate greatly increased ad rates for the hosting site, or may be used to measure other things relating to marketing effectiveness.

Systems in common use today capture only the number of clicks made on an ad link or coupon, or at best the number and source of those clicks. The back end of the present embodiment may measure all this as well as the quality of each click. Using tagging measures, a correlation can be developed between the conversion rate at the target site and the coupon quality from the tagged sources. Modifications to the matching function may then be made using a procedure similar to one layer back propagation in neural networks, allowing optimization for any set of domains 66. A side effect of this is that it is possible to measure the utility of each of the domains 66 selected for the semantic space based on the weights found for each domain 66 after the propagation phase.

The invention gives the user a new way of determining targets for and delivering high quality coupons to users, where quality is a measure of the match between a user's demonstrated interests and the content of the coupon and base web page. It relies on three constructs, namely, partition of a semantic space into a set of domains 66, definition of those domains 66 in terms of semantic entities, and a mechanism to construct and maintain a picture of a given user with respect to one of more sets of domains 66.

Partitioning a semantic space into a set of domains 66 may be a manual process. To do this, a domain expert may delineate the semantic loci in the space. Mathematically speaking, it does not matter what the domains 66 are called or even what their relative size is in terms of a random training set being assigned as members. It only matters that a partition is made that can be well-separated with a finite list of semantic entities, such that any semantic entity is a member of a very small fraction of the domains 66 and each domain 66 has many such entities.

Semantic entities can be anything from simple keywords to semantic constructs, which are assertions that are made up of simpler entities tied together with rules. The only constraint on a semantic entity is that it can be extracted from some sequence of combinations of raw text. In most cases, the set of semantic entities used to represent a domain 66 is derived from a list of master assertions commonly answered by text in the domain 66, if the domain in question is Breast Cancer, one question that is commonly answered is what stage of cancer a patient is generally at. By compiling a list of domain-specific questions, it is possible to (1) specify differences between very similar domains 66 with great precision, and (2) create a rapid way to prototype a domain 66 that does not require many hours of an expert's time, and can be expanded by relatively inexperienced people.

Where it is only necessary to classify a piece of text rather than extract actual values for the assertions in the domain, the master assertions can be "factored" into their simplified descendants and those which are common to a large percentage of the domains 66 in question can then be removed, leaving (mostly) a list of keywords and phrases to define a domain 66. This speeds the comparison and classification processes tremendously.

The mechanism to create and maintain a domain-based picture (or sense-based picture) of a user can be as simple as a cookie stored on the user's machine that is used to update a user vector stored in a central database. This only functions when the user is surfing through sites that participate in the personalization system. Another slightly more complex implementation is something like a Browser Helper Object that runs on the user's machine and watches/categorizes all surfing activity. With this system, even non-participating sites can contribute to the picture of the user, and any clicking the user does to ad sites served by certified coupons will pick up a much more comprehensive picture.

The system may start with zero knowledge about the user. When the user begins browsing, either through a participating site or by initializing the BHO, a new record may be created in the database for that user. Every time the user clicks on a link, the contents of the returned page may be used to update the picture of the user in the manner summarized above. The user may control the image being built up, or may even create multiple images of him or herself and select which image is presented as the current valid representation of the user's state. These images, or "aspects," represent the different roles that a given person might take on during the course of time. For example, a person might have a business aspect, wherein they are looking for things like printers, software, and computers, and a vacation aspect, where they are searching for good tours through Chile and Argentina. Once aspects are created by the user, browsing activity can be automatically assigned to the correct aspect simply by doing a global domain count match between the current site and all available aspects. Similarly, the user's current aspect or role can be inferred from the sites being browsed.

Updating of aspects or core personalization attributes can happen each time a different site is visited, or on a more delayed basis (in the case where the user is running the BHO). Historical data may be maintained. However, history data may not be needed as the hysteresis maintains an implicit history.

Sites that implement a certified coupons program need only query the central database to resolve the identity of a user's aspect and verify a sufficiently close match. The provided information can be additionally used to customize the coupon for the incoming user, based on ancillary interests the user might have.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method comprising:
    providing an online advertisement linked to content;
    obtaining a macro-context vector specifying classification of the content within a domain corresponding to a semantic space;
    obtaining a personalization vector quantifying the affinity of at least one aspect of a user for a plurality of domains;
    selecting, by the user, the online advertisement; and
    multiplying, by a processing element, the personalization vector and the macro-context vector to obtain a match value quantifying the similarity between the personalization vector and the macro-context vector.

2. The method of claim 1, further comprising selecting a match threshold corresponding to a particular match value.

3. The method of claim 2, wherein the match threshold is selected by an advertiser associated with the online advertisement.

4. The method of claim 2, further comprising billing the advertiser a first amount when the match value is less than the match threshold.

5. The method of claim 4, further comprising billing the advertiser a second amount when the match value is more than the match threshold.

6. The method of claim 5, wherein the second amount is greater than the first amount.

7. The method of claim 6, wherein calculating the match value begins upon selection by the user of the online advertisement.

8. The method of claim 7, wherein the personalization vector is derived at least in part from an online search and click history of the user.

9. The method of claim 8, wherein multiplying comprises using one of using a dot product and a weighted dot product.

10. The method of claim 1, further comprising billing an advertiser associated with the online advertisement a greater amount when the match value is above a match threshold.

11. The method of claim 1, further comprising billing an advertiser associated with the online advertisement a greater amount when the match value is above a match threshold selected by the advertiser.

12. The method of claim 1, wherein calculating the match value begins upon selection by the user of the online advertisement.

13. The method of claim 1, wherein the personalization vector is derived at least in part from an online search and click history of the user.

14. The method of claim 1, wherein calculating a match value comprises multiplying together the macro-context vector and the personalization vector using one of a dot product and a weighted dot product.

15. A method comprising:
    providing an online advertisement linked to content;
    obtaining a first vector specifying classification of the content within a domain corresponding to a semantic space;
    obtaining a second vector containing numerical values quantifying the affinity of at least one aspect of a user for each domain of a plurality of domains;
    selecting, by the user, the online advertisement; and
    multiplying, by a processing element, the first vector and the second vector to obtain a match value quantifying the similarity between the first vector and the second vector.

16. The method of claim 15, wherein the second vector is derived at least in part from a third vector corresponding to a first website browsed by the user, the third vector containing numerical values quantifying the affinity of the first website for each domain of the plurality of domains.

17. The method of claim 16, wherein the second vector is derived at least in part from a fourth vector corresponding to a second website browsed by the user, the forth vector containing numerical values quantifying the affinity of the second website for each domain of the plurality of domains.

* * * * *